United States Patent [19]

Bargain et al.

[11] 4,145,508
[45] Mar. 20, 1979

[54] POLYSILOXANE THERMOPLASTIC ELASTOMERS

[75] Inventors: Michel Bargain, Lyons; Marcel Lefort, Caluire, both of France

[73] Assignee: Rhone-Poulenc Industries, Paris, France

[21] Appl. No.: 817,342

[22] Filed: Jul. 20, 1977

[30] Foreign Application Priority Data

Aug. 17, 1976 [FR] France .................. 76 25533

[51] Int. Cl.² ............ C08G 77/06; C08G 77/12; C08G 77/26
[52] U.S. Cl. .................... 528/31; 260/825; 260/827; 528/15; 528/32
[58] Field of Search ........... 260/46.5 E, 825, 827; 528/31, 32, 15

[56] References Cited

U.S. PATENT DOCUMENTS

| 3,436,366 | 4/1969 | Modic | 260/825 |
| 3,657,303 | 4/1972 | Golitz et al. | 260/46.5 E |
| 3,701,795 | 10/1972 | Holub et al. | 260/46.5 E |
| 3,740,305 | 6/1973 | Hoback et al. | 260/46.5 E |
| 3,766,127 | 10/1963 | Clark et al. | 260/825 |

Primary Examiner—Wilbert J. Briggs, Sr.
Attorney, Agent, or Firm—Bacon & Thomas

[57] ABSTRACT

Novel polysiloxane thermoplastic elastomers and processes for their preparation are disclosed. The elastomers are obtained by reaction of $\alpha,\omega$-dihydrogenpolysiloxane with a diethylene silicon compound.

10 Claims, No Drawings

POLYSILOXANE THERMOPLASTIC ELASTOMERS

BACKGROUND OF THE INVENTION

1. Field of the Invention

The present invention is directed to polysiloxane thermoplastic elastomers and methods for their production.

2. Description of the Prior Art

The use of organosilicon compounds in preparing thermoplastic elastomers is well recognized in the art. For example, in Belgian Patent Specification No. 834,046, published Mar. 30, 1976, polysiloxane thermoplastic elastomers are formed from recurrent groups of silicon bonded to oxygen upon which other functional groups may be attached to form complex, branched chain thermoplastic polymers.

Since the demand for silicon containing thermoplastic elastomers is great due to their versatility, there is a constant need in the art for organosilicon compounds which can be used to prepare new silicon-containing thermoplastic elastomers.

SUMMARY OF THE INVENTION

Accordingly, it is a primary object of the present invention to provide novel polysiloxane thermoplastic elastomers.

Another object of the invention is to provide processes for the preparation of polysiloxane thermoplastic elastomers.

Still another object of the invention is to provide novel elastomeric compositions which are particularly useful in the manufacture of molded objects made of films or fibers.

Other objects and advantages of the invention will become evident to those of skill in the art after reading the detailed description which follows.

DETAILED DESCRIPTION OF THE INVENTION

The elastomers of the present invention are characterized by the fact that they consist of a plurality of recurrent moieties of the following formula:

$$\left[ R_o-Si(R_1)_2-G-Y-Q_o-Y-G-Si(R_1)_2-R_o- \right.$$

$$\left. -Si\overset{(Q_1)_2}{\underset{|}{\phantom{|}}}- \left[ O-Si\overset{(Q_1)_2}{\underset{|}{\phantom{|}}}- \right]_n O-Si\overset{(Q_1)_2}{\underset{|}{\phantom{|}}}- \right] \quad \text{I}$$

wherein:

$R_o$ represents divalent hydrocarbon radicals containing 2 to 10 carbon atoms.

$R_1$ and $Q_1$ represents monovalent hydrocarbon radicals selected from the group consisting of linear or branched alkyl radicals containing up to 10 carbon atoms, cycloalkyl radicals containing 3 to 6 atoms of carbon in the cycles, and aryl radicals. Alternately, these radicals may be replaced by one or more halogen atoms or cyano groups.

G represents aromatic carbocyclic radicals or heterocyclic radicals, which may be monocyclic or polycyclic. If polycyclic, the cycles can be condensed or related by a simple bond or by an atom or group such as —O—, —CH$_2$—, —C(CH$_3$)$_2$—, —SO$_2$—, —CONH—.

$Q_o$ represents a divalent radical selected from the group consisting of aliphatic radicals having as many as 13 carbon atoms, the cyclo-aliphatic radicals having five or six carbon atoms in the cycle, heterocyclic radicals, and aromatic radicals comprising one or several benzene nuclei. The benzene nuclei can be condensed or otherwise related by a simple bond or by an atom or a group such as —CH$_2$—, —C(CH$_3$)$_2$—, —O—, $$-\underset{\underset{O}{\|}}{C}-O-,$$

—CONH—.

Y represents a radical selected from the group consisting of —CONH— or —COO—.

n is a number within the range of 0 to 2,000. In any given elastomer prepared according to the invention, the radicals represented by the letter symbols are not required to be the same throughout; rather, they may be any radical which the symbol represents.

According to a preferred embodiment, the various symbols of formula I have the following meanings:

$R_o$: an ethylene radical selected from the group consisting of propylene-1,3; propylene-1,2; butylene-1,4; butylene-1,3; butylene-2,3; pentylene-1,5; pentylene-1,4; hexamethylene; octamethylene; decamethylene; monochloroethylene; dichloroethylene; difluoro-1,2 ethylene; cyclohexylene-1,4; cyclohexylene-1,3.

$R_1$ and $Q_1$: a radical selected from the group consisting of methyl, ethyl, trifluoro-4,4,4 butyl, phenyl, o- m- or p-tolyl, xylyl, p- or m-chlorophenyl, dichloro-3,5 phenyl, trichlorophenyl, tetrachlorophenyl, β-cyanoethyl, γ-cyanopropyl.

G: a radical selected from the group consisting of

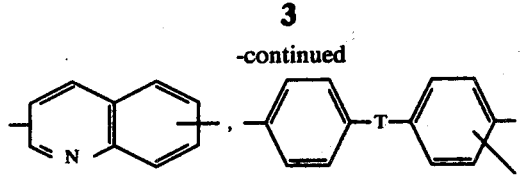

-continued

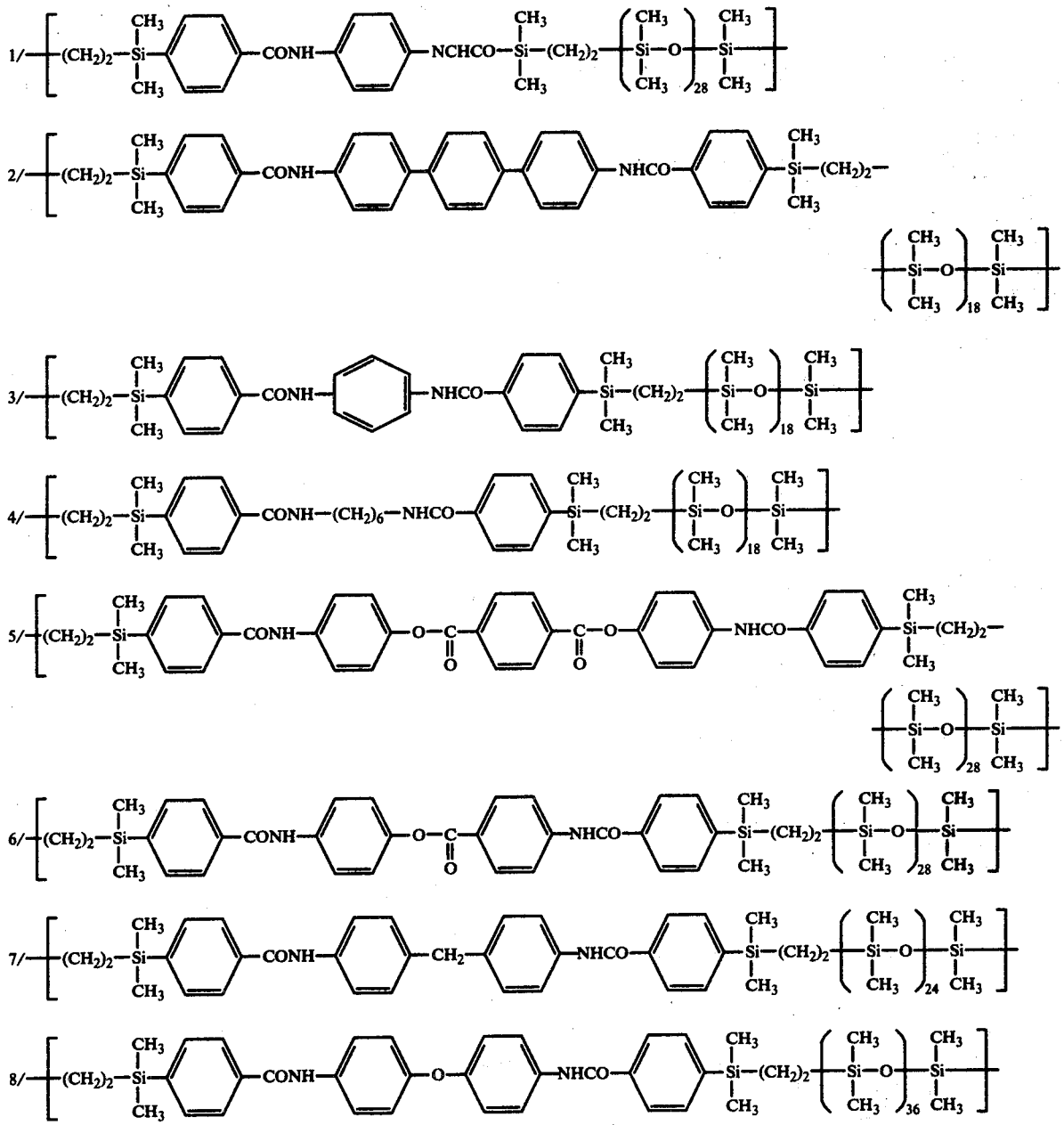

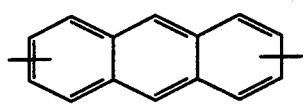

wherein $a$ is equal to 1 to 2 and T represents a simple bond or —O—, —CH$_2$—, —C(CH$_3$)$_2$— or SO$_2$.

Q: a divalent radical selected from the group consisting of pentamethylene, hexamethylene, cyclohexylene, one of the radicals represented by the symbol G, and radicals containing as many as five benzene nuclei joined together by a group represented by T or a group —COO— or —CONH—.

n is a number within range from 3 to 500.

Illustrative of the polymers which are the subject of the present invention as depicted by formula I are those which consist of a plurality of the following recurrent units:

The thermoplastic elastomers which are the subject of the present invention can be prepared by reaction of the following compounds:

a. At least one diethylene silicon compound of the formula:

with b. at least one β,ω-dihydrogenopolysiloxane of the formula:

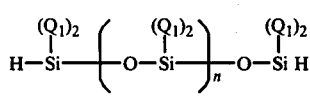

In formulas II and III, the symbols $R_1$, G, Y, $Q_o$, $Q_1$, and n have the meanings recited above. The symbol R represents monovalent hydrocarbon containing as many as 10 carbon atoms and a carbon-carbon double bond. As is the case with the radicals represented by the other symbols, the radicals represented by R may be the same or different throughout a given elastomer.

According to a preferred embodiment R represents a radical selected from the group consisting of vinyl, allyl, dichloro-2,2 vinyl, trichloro-1,2,2, vinyl, butene-2 yl, propene- 1 yl, methyl-2-propene-1 yl and butene-1 yl.

Exemplary of the diethylene silicon compounds depicted by formula II are the following:

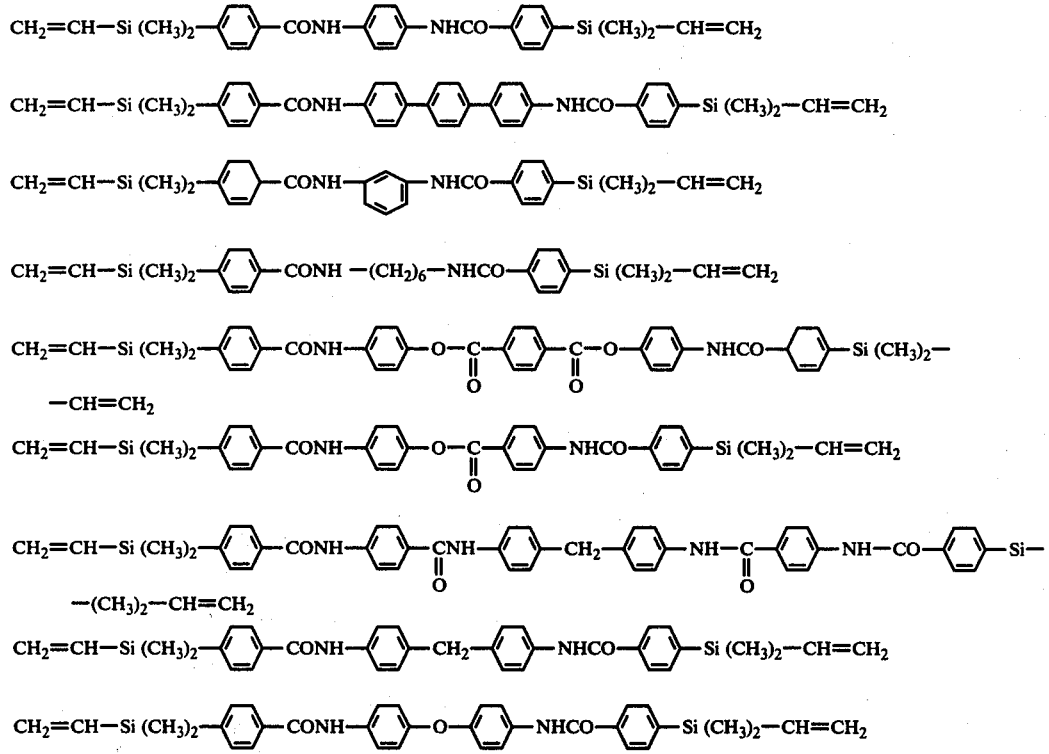

The diethylene silicon compounds of formula II

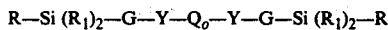

can be prepared by reaction of:
a. a silane of the formula

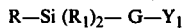  IV and
b. a compound of the formula

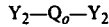  V

In these formulas, the symbols R, $R_1$, G, and $Q_o$ have the meanings recited above. The symbols $Y_1$ and $Y_2$ represent groups which react together to form groups represented by the symbol Y, as defined above. The quantities of the silane reactant a and of the other reactant b are supplied to the reaction medium in the ratio of two moles of silane a per mole of the compound b. The silane reactant can be supplied as a single silane or a mixture of silanes corresponding to formula IV.

In formulas IV and V the symbol $Y_1$ represents a radical selected from the group consisting of —COOH, —COOR$_2$, (R$_2$ being an alkyl radical having one to four carbon atoms), —COOM (M being an atom of sodium, potassium, or lithium) and —COCl. $Y_2$ represents either of the groups NH$_2$ or OH.

The silanes of the formula IV can be prepared from other silanes of the formula

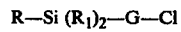  VI by application of conventional methods uch as carbonation and esterification. The silanes of formula VI can be prepared by a reaction utilizing an organomagnesium halide complex (Grignard reagent) according to the following process:

a. Condensation of Grignard reagent containing the radical G with a dichlorinated silicon reactant:

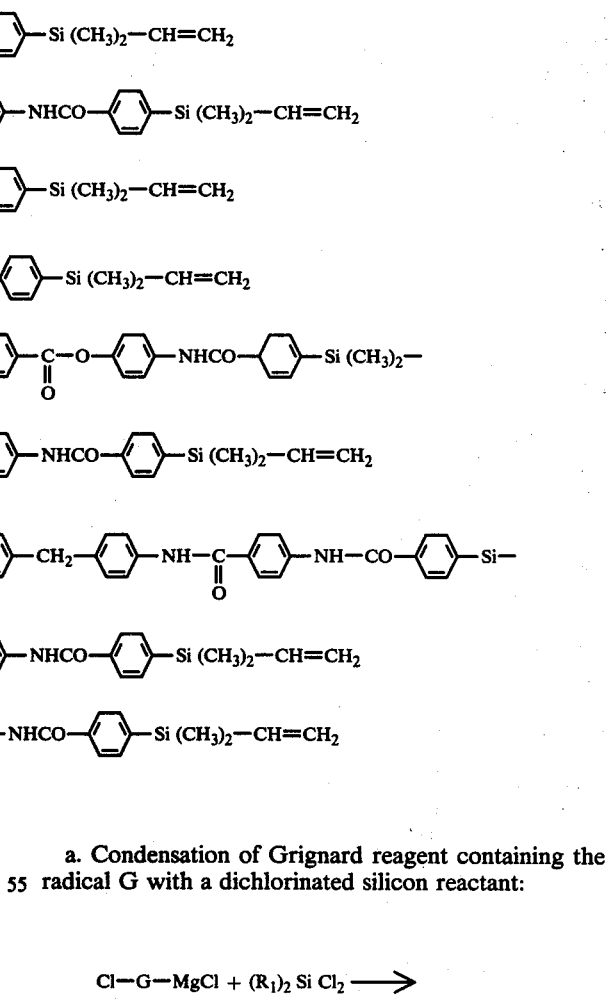

b. Condensation of the product (A) with Grignard reagent, R Mg Cl:

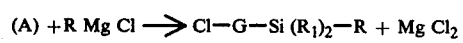

The compounds represented by formula V are polyols, polyphenols, aminoalcohols and aminophenols, whose methods of preparation are well known to those of skill in the art.

Typical of the silanes represented by formula IV are the following:
vinyldimethylsilyl-4 benzoic acid
chlorocarbonyl-1 vinyldimethylsilyl-4 benzene
divinylmethylsilyl-4 benzoic acid
methoxycarbonyl-1 vinyldimethylsilyl-4 benzene
ethoxycarbonyl-1 vinyldimethylsilyl-4 benzene
ethoxycarbonyl-3 vinyldimethylsilyl-4 pyridine
vinyl dimethylsilyl-4 methoxycarbonyl-4' diphenyl methane
vinyl dimethylsilyl-4-methoxycarbonyl-4' diphenyl ether Illustrative of the compounds depicted by formula V are (A) Polyamines such as:
hexamethylenediamine
bis (amino-4 cyclohexyl)-2,2 propane
m-phenylenediamine
p-phenylenediamine
triamino-1,2,4 benzene
m-xylylenediamine
p-xylylenediamine
bis (amino-4 phenyl) methane
diamino-4,4' phenyl oxide
diamino-4,4' benzophenone
diamino-4,4' benzoate of phenol
N,N' bis (p-aminobenzoyl) diamino-4,4' diphenyl methane
bis p-(amino-4 phenoxy) benzene
diamino-2,6 pyridine (B) Polyols or polyphenols such as:
ethylene glycol
propanediol-1,3
butanediol-1,4
pentanediol-1,5
hexanediol-1,6
heptanediol-1,7
bis (δ hydroxybutyl)-1,4 cyclohexane
bis (β hydroxyethyl)-1,4 benzene
hydroquinone
resorcinol
dihydroxy-1,5 naphthalene
dihydroxy-4,4' biphenyl
bis (hydroxy-4 phenyl) methane
bis (hydroxy-4 phenyl) sulfone (C) Amino-alcohols or aminophenols such as:
ethanolamine
amino-3 propanol-1
amino-4 butanol-1
amino-5 pentanol-1
amino-6 hexanol-1
amino-6 methyl-5 hexanol-1
amino-10 decanol-1
p-aminophenyl-4 cyclohexanol
p-hydroxymethylbenzylamine
hydroxymethyl-4 aminomethyl-4' biphenyl
(p-amino) phenethylic alcohol Alternately, the thermoplastic elastomers of the present invention can be prepared by reaction of:
a. at least one diethylene silicon compound of the formula:

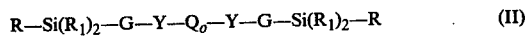

in which the symbols have the same meaning recited above, with
b. a hydrogenosilane of the formula

to form a dichlorotetrasilane of the formula

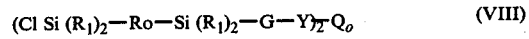

The dichlorotetrasilane is then reacted with an α,ω-dihydroxylated polysiloxane or α,ω-diaminated polysiloxane resulting in a product of formula (I).

The α,ω-dihydrogenopolysiloxanes of formula III, which are used for preparation of thermoplastic elastomers, are well known products obtained by conventional techniques as, for example, hydrolysis of a monohalogenodiorganosilane such as the monochlorodimethylsilane, or cohydrolysis of a monohalogenodiorganosilane or a dihalogenodiorganosilane, and/or a cyclic polydiorganosiloxane such as octamethylcyclotetrasiloxane. In the same manner a reaction of a monohalogendiorganosilane with an α,ω-dihydroxypolysiloxane of different molecular weights, or with an α,ω-dialkoxypolysiloxane results in the formation of α,ω-dihydrogenpolysiloxanes. Likewise, a reaction of a dihydrogenodiorganosiloxane with an α,ω-dihydroxypolysiloxane or an α,ω-dihalogenodiorganosiloxane with a metallic hydride such as lithium aluminohydride, may be employed. Finally, the formula III compounds can be prepared via cationic polymerization of an octaorganocyclotetrasiloxane such as octamethylcyclotetrasiloxane, with an α,ω-dihydrogenomonosiloxane such as α,ω-dihydrogenotetramethylsiloxane.

The molecular weight of a particular α,ω-dihydrogenosiloxane of formula III is determined by the value of n, which varies from 0 to 2,000. Generally, n is maintained between about 3 and 500, and preferably between about 10 and 200, and most preferably between about 10 and 80.

The α,ω-dihydrogenopolysiloxane used in accordance with the present invention can be a homopolysiloxane or a copolymer derived from two or more dihalogenodiorganosiloxanes. The copolymers may exist as random or block copolymers.

Typical of the α,ω-dihydrogenpolysiloxanes of formula III are:
dihydrogenotetramethyldisiloxane;
dihydrogenodiethyldimethyldisiloxane;
dihydrogenodiphenyldimethyldisiloxane;
as well as the compounds of the following formulas:

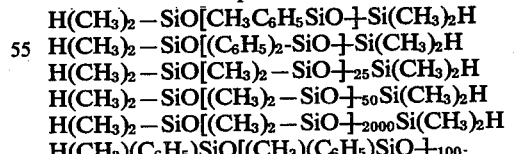
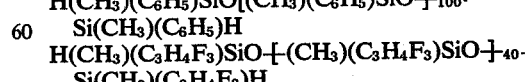
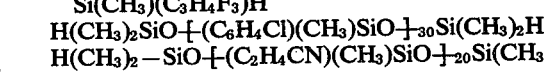

The reaction between the diethylene silicon compound (formula II) and the α,ω-dihydrogenpolysiloxane (formula III) to produce the thermoplastic elastomers of the present invention is conducted under conditions which are customarily used when compounds are added to groups of ≡ Si — H to ethylene compounds — see W. Noll, CHEMISTRY AND TECHNOLOGY OF SILICONES (1968), pages 49 and following. Thus, the reaction of hydrosilylation is accomplished by heating the reagents at a temperature between 150 and 350° C. under autogenic pressure, in the absence of catalysts. The reaction may also be accomplished in the presence of the usual catalysts which allow the use of lower temperatures, in the order of 0° to 200° C. In such cases the reaction proceeds faster under normal pressure.

The free radical generating catalysts such as peroxide compounds (acyl peroxides, alkyl peroxides, peresters, etc.) or nitrogen compounds have been found to be useful in accelerating the reaction. They include benzoyl peroxide, acetyl peroxide, lauroyl peroxide, t-butyl perbenzoate, t-butyl peracetate, t-butyl peroxide, N,N'-azo-bis-isobutyronitrile. However, the same effect is obtained by operating under ultraviolet irradiation instead of conducting the reaction in the presence of free radical generating catalysts.

Another group of catalysts which can be used in preparing the thermoplastic elastomers according to the invention consists of metals of group VIII of the periodic table of elements (see HANDBOOK OF CHEMISTRY AND PHYSICS, 53rd Edition) and their mineral or organic derivatives. These metals include, in particular, noble metals such as Pt, Ru, Rh, Pd and Ir. Platinum is the most preferred. The metal catalysts can be used in elementary form or in the form of mineral salts of acids, particularly halogenates, organic salts of acids, or metal complexes. Such catalysts are described in the prior art, as for example: U.S. Pat. Nos. 2,637,738 and 2,632,013 — J. L. Speier et al — in the JOURNAL OF THE AMERICAN CHEMICAL SOCIETY, Volume 79, p. 974, and following (1957); A. J. Chalk et al — in the JOURNAL OF THE AMERICAN CHEMICAL SOCIETY, Volume 87, No. 16 (1965).

Among the catalysts derived from metals of Group VIII, those containing platinum are particularly suitable and are preferred. They exist in different forms which are well known to those of skill in the art. Thus, catalysts based on elementary platinum separated in fine grains and which, optionally, may be deposited on supports such as carbon black, aluminum, silica yield the best results. Catalysts of this type have been described particularly in U.S. Pat. No. 2,970,150. Another group of platinum-based catalysts consists of chloroplatinic acid (see U.S. Pat. No. 2,823,218) and compounds derived therefrom, such as alkaline chloroplatinates (see J. L. Speier, loco citato) and compounds obtained by reaction of chloroplatinic acid with alcohols, ethers, or aldehydes (see U.S. Pat No. 3,220,972), olefines, (see Americal Patent No. 3,159,662). Halogenates of platinum with compounds which produce electronic doublets such as phosphines, for example bis (tributylphosphino) dichloroplatinum (II) and bis(triphenylphosphino) dichloroplatinum (II) (see A. J. Chalk et al loco citato) are also operable. However, elementary platinum deposited on carbon and chloroplatinic acid and its derivatives are preferred.

The hydrosilylation reaction can be conducted in a solvent-free environment or in an organic environment consisting of a solvent or an inert diluent. Operable solvents include saturated aliphatic hydrocarbons: pentane, hexane, heptane; saturated cycloaliphatic hydrocarbons (cyclohexane); aromatic hydrocarbons: benzene, toluene; halogenated hydrocarbons: chloroform, dichloroethane, chlorobenzene; alcohols: ethanol, propanol, isopropanol; ethers: tetrahydrofurane; esters: methyl acetate, ethyl acetate, butyl acetate. The choice of the environment depends on the nature of the reactants and on the temperature at which the reaction takes place. The reaction can be conducted in a solution or suspension, depending on whether one or both reactants are soluble in the selected reaction environment.

The relative quantities of the compounds of formula (II), which hereinafter are referred to as "dialkenylsilane monomers" or "dialkenylsilanes," and of $\alpha,\omega$-dihydrogenopolysiloxane, which hereinafter is termed "dihydrogeno monomer," can very within broad limits. Thus, the relative quantity of the reactants, expressed in relation to the number of the alkenyl groups contained in the dialkenylsilane monomer to the number of active atoms of hydrogen contained in the dihydrogeno monomer can vary from about 2 to 0.5. However, in order to obtain polymers of high molecular weight, it is preferably that the ratio specified above be approximately 1. Thus, the ratio of the alkenyl group to active atoms of hydrogen may vary between about 1.2 and 0.8. The desired molecular weight of the product thermoplastic elastomer can be obtained by use of a chain terminating agent consisting of a silicate compound containing a single group of ≡ Si — H, or an organic or organosilicic compound containing a carbon-carbon double bond. Although any compound with a group of ≡ Si — H may be used as a chain terminator, trimethylsilane, triethylsilane, tri-n-propylsilane and diethylmethylsilane are preferred. Of the chain terminators containing an alkenyl group, organosilicic compounds such as trimethylvinylsilane, triethylvinylsilane, and allyltrimethylsilane are preferred. Monosaturated organic compounds such as vinylacetate, styrene and alkylbenzene are additional examples of chain terminating agents.

The quantity of the chain-terminating agent employed is dependent upon the particular molecular weight desired for the thermoplastic elastomer product. In the hydrosilylation reaction, the required quantity of catalyst varies within very broad limits, depending upon the nature of the catalysts, the nature of the reactants, and the conditions of the reaction. For example, when a free radical generating catalyst is employed, an amount of $1 \times 10^{-4}$ to 0.1 mole of catalyst per mole of dialkenylsilane monomer is used, even though these limits could be exceeded without detrimental results. If the catalyst is one of the Group VIIi metals or a derivative thereof, particularly platinum, the amount of the catalyst expressed in gram-atom of metal per alkenyl group present in the dialkenyl monomer, varies between about $10^{-6}$ and $10^1$ gram-atom of metal per alkenyl group, and preferably between about $10^{-5}$ and $10^{-2}$.

The temperature of the reaction may vary within broad limits, being dependent upon the presence of a catalyst and the nature and quantity of the particular catalyst employed. Generally, the temperature may vary between about 0 and 300° C., and preferably between about 20 and 250° C. The use of platinum catalyst makes it possible to operate at temperatures in the order of about 10 to 200° C. The reaction can be conducted at, above or below atmospheric pressure.

The thermoplastic elastomers prepared according to the present invention have utility wherever silicon elastomers are required. They retain the properties of these silicons. However, they can also be used in place of other thermoplastic polymers, due to the ease with which they can be put into operation. They can be molded by extrusion, injection in melted stage, or stamping. They are particularly suitable for making films or fibers. They can also be transformed into finished objects from their solutions in organic solvents. They can be mixed with the usual additives: pigments, silicon additives, titanium oxides, carbon black, plastifiers, or stabilizers.

The following examples are intended to further illustrate the present invention and in no way are intended to limit the scope of the invention.

EXAMPLE 1 a. Preparation of Thermoplastic Elastomer 2.269 grams of disilane of the following formula were placed in a balloon-flask of 250 milliliters:

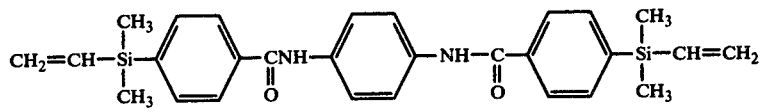

along with
10.0683 grams of α,ω-dihydrogenopolydimethylsiloxane of average molecular mass of 2150, viscosity measured at 25° C. and equal to 26.5 Cst, and containing 0.093 atom of hydrogen per 100 grams of polysiloxane;
and 37.01 grams of dioxane.

This mixture was shaken and heated until the solvent started to boil. It became homogeneous after a few minutes of refluxing. Addition of 0.3 cubic centimeters of catalyst (derivative of chloroplatinic acid, diluted with toluene, forming a solution containing 3.3 microequivalents of platinum per cubic centimeter) provoked a noticeable increase of the reflux of dioxane and a slight increase of viscosity. The shaking of the mixture was continued and the reflux was provoked over an additional period of 5 hours and 20 minutes.

A solution which is rather viscous when hot, and which produced a cloudy gel when cold was obtained. Using the hot solution, a transparent film was prepared by spreading the mixture on a glass plate and evaporating the solvent in a stove over a period of 1 hour and 30 minutes at 100° C.

The resulting polymer showed elastomeric properties and a softening point at 100° C. The inherent viscosity of a solution of 5 grams per liter in chloroform was 0.22 deciliters per gram.

Infrared and nuclear magnetic resonance analyses made it possible to attribute the following structure to this polymer:

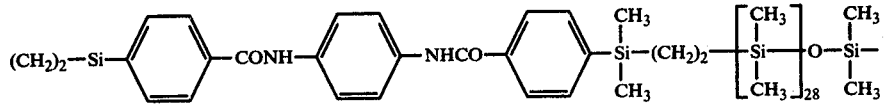

b. Preparation of Diethylene Disilane

Twenty-one and six-tenth grams of p-phenylene diamine and 200 cubic centimeters of N-methylpyrrolidone were placed in a reactor. Over the course of 1 hour, 90 grams (0.4 mole) of dimethylvinylsilyl-4 benzoyl chloride were poured in the suspension which had been cooled to about 5°. After maintaining the reactive environment at 25° C. during 4 hours, it was precipitated in a liter of cold water. The p-phenylene bis (dimethylvinylsilyl-4 benzamide) was crystallized in the dioxane. The dimethylvinylsilyl-4 benzoyl chloride itself was prepared according to the following process:

Forty cubic centimeters (0.33 mole) of dimethyldichlorosilane at 20° C. were placed in a three-neck balloon-flask swept by a current of nitrogen. Eighty cubic centimeters of toluene were added while the mixture was shaken. The temperature was reduced to 5° C. and then during the next 30 minutes 0.33 mole of p-chlorophenylmagnesium chloride in the form of a solution in tetrahydrofurane (140 cubic centimeters) was added. Twenty cubic centimeters of toluene were added, followed by agitating the mixture for 2 hours 30 minutes. Then in the next 20 minutes 0.36 mole of vinylmagnesium chloride in the form of a solution in tetrahydrofurane (120 cubic centimeters) was introduced into the environment, the temperature at that time being 25° C. Then the temperature of the reactive environment was increased to 80° C. and maintained for 2 hours. The reactive environment was cooled, washed twice with 100 cubic centimeters of water containing 5 cubic centimeters of HCl. Following decantation, neutralization by means of sodium bicarbonate, drying, 42 grams of a product containing (chromatography in gaseous phase) 80 percent in weight of p-chlorophenyldimethylvinylsilane were collected.

Twelve and one-half grams of magnesium in the form of chips were placed in a three-neck balloon-flask in a current of nitrogen, followed by 10 cubic centimeters of "magnesian sediment" ("pied de magnesien" "M" which comes from a previous operation). The mixture was heated to 70° C., then 99 grams of dimethylvinylchlorophenylsilane prepared as indicated above were added to the solution in 150 cubic centimeters of THF [tetrahydrofurane]. The flow of chlorophenylsilane was completed in 2 hours. The mixture boiled, the tetrahydrofurane THF being refluxed over a period of 12 hours in order to complete the reaction, then the environment containing p-(dimethylvinylsilyl) phenyl magnesium chloride "M" was withdrawn. Two hundred cubic centimeters of THF were poured in a balloon-flask, which was then cooled by a bath of ice/acetone and saturated with $CO_2$ by splashing. Then the magnesian was poured in the balloon-flask, while keeping an excess of $CO_2$ and maintaining the temperature of the reactive environment around 10° C. This reactive environment was then poured into 2 liters of iced water acidified by 55 cubic centimeters of a solution of HCl 10 N. Two hundred and fifty cubic centimeters of toluene were added to stimulate decantation of the resulting paste.

After washing, treatment in a basic environment, precipitation, 62 grams of a white product were collected, which had a point of fusion of 82° C. and was identified as vinyldimethylsilyl-4 benzoic acid. This acid (850 grams = 3.75 mole) was placed in a balloon-flask and heated to 90° C. The product became a thick liquid when shaken out. Then over a period of 1 hour and 30 minutes 595 grams (5 moles) of thionyl chloride were introduced into this environment. The reaction was endothermic. The reactive environment was maintained at 45° C. for a period of 1 hour 20 minutes.

Dimethylvinylsilyl-4 benzoyl chloride was collected. (Boiling point at 98.5°-100° C. under pressure of 3 millimeters of mercury).

EXAMPLE 2 a. Preparation of Thermoplastic Elastomer 2.8675 grams of disilane of the following formula was placed in balloon-flask of 250 milliliters:

b. Preparation of the Diethylene Disilane

Twenty-four grams (0.1 mole) of amino-4-benzoate of amino-4' phenyl and 150 cubic centimeters of N-methyl-pyrrolidone were placed in a reactor. In a solution cooled to 5° C., 41 grams (0.2 mole) of dimethylvinylsilyl-4 benzoyl chloride (prepared as shown in Example 1) were poured over 1 hour.

The homogeneous reactive environment was kept for 2 hours at 25° C., then precipitated in 1 liter of iced water. After recrystallization in alcohol, the dimethylvinylsilyl-4 benzmido-4' benzoate of (dimethylvinylsilyl-4" benzamido-4''' phenyl was collected.

EXAMPLE 3

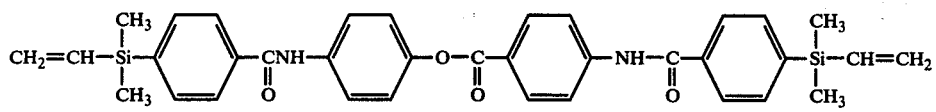

along with
  10.1956 grams of α,Ω-dihydrogenopolydimethyl-siloxane from Example 1, and
  39.19 grams of dioxane.

a. Preparation of Thermoplastic Elastomer 3.3507 grams of a disilane were placed in a balloon-flask with a capacity of 250 milliliters:

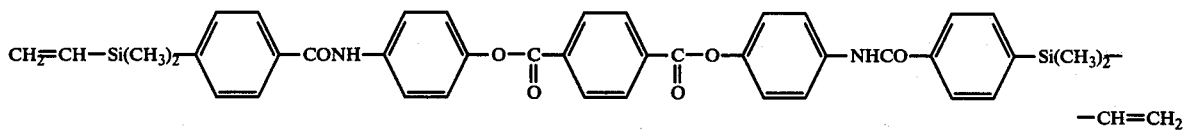

This mixture, which consisted of three phases when cold, was shaken and brought to boiling. A homogeneous solution was obtained between 80° C. and 90° C. The addition of a catalyst from Example 1 (0.3 milliliter only once) had a brief and noticeable exothermic effect: the temperature rose rapidly to 100° C. (reflux of dioxane). Agitation was continued and the reflux was maintained for an additional 4 hours and 45 minutes.

A viscous solution was produced which remained homogeneous when cold. The polymer, isolated by evaporation from the solvent, had a softening point at 175° C. A solution of 5 grams per liter in chloroform had an inherent viscosity of 0.51 deciliter per gram.

The structure of this polymer corresponded to the formula as follows:

along with
  9.9394 grams of α,ω-dihydrogenopolydimethylsiloxane used in Example 1, and
  39.87 grams of dioxane.

This mixture, which formed a white suspension, was shaken and heated until the solvent refluxed. The addition of the catalyst mentioned in Example 1 (0.3 milliliter just once) produced a short and perceptible exothermic effect (increase of reflux). A progressive increase of viscosity of the reactive environment and dissolution of the unsaturated compound were observed.

The shaking and the reflux were continued for an additional 6 hours and 20 minutes. The polymer was precipitated in methanol in the form of a white powder.

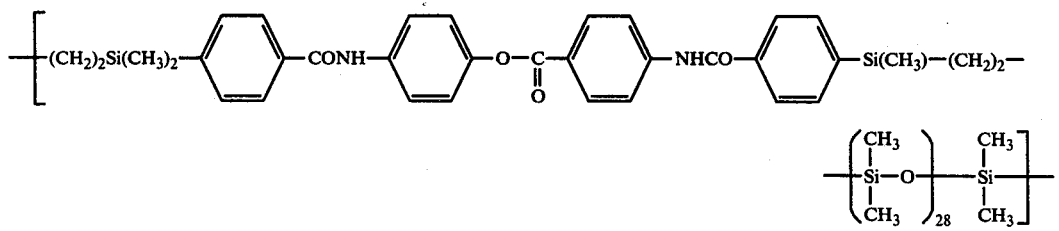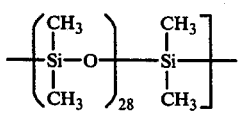

A film 135 μ thick prepared by pouring a solution of this polymer in dioxane (25 percent in weight) and drying it (for 2 hours at 100° C.) presented the following properties:

Percent elongation: 570±33%

Resistance to breaking: 52±3 kilograms per square centimeter

The softening point was 250° C., and the inherent viscosity 0.61 deciliter per gram solution (at a concentration of 5 grams per liter in chloroform).

This polymer corresponded to the following formula:

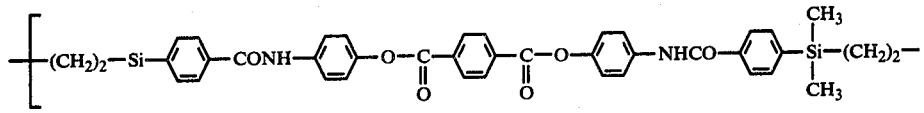

b. Preparation of the Diethylene Disilane

We put in a balloon-flask 35 grams (0.1 mole) of terephthalate of bis(amino-4 phenyl) and 300 cubic centimeters of N-methylpyrrolidone. We poured, in the course of 1 hour, 45 grams of dimethylvinylsilyl-4 benzoyl (0.2 mole) in the solution cooled to about 5° C. We kept the reactive environment at 25° C. for 4 hours, then we precipitated it in 1 liter of ice water. After recrystallization in dimethylformamide, we collected the terephthalate of bis(dimethylvinylsilyl-4 benzamido-4' phenyl).

EXAMPLE 4 a. Preparation of Thermoplastic Elastomer 2.8569 grams of disilane of the following formula were placed in a reactor of 250 milliliters:

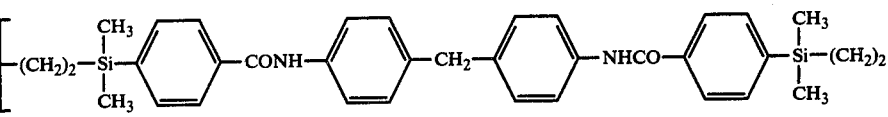

along with
  9.1354 grams of an α,ω-dihydrogenopolydimethylsiloxane of the average molecular weight of 1835 and 41.6 cubic centimeters of toluene.

The resulting suspension was shaken and heated. The environment became homogeneous before reaching the temperature of the reflux of the solvent. An addition of 0.32 milliliter of the catalyst given in Example 1 produced an exothermic effect and a clear increase in viscosity.

The shaking and reflux was continued for an additional 7 hours and 30 minutes. The solution of the polymer obtained in this way was then diluted with 15 milliliters of toluene before it was spread on a glass plate to make a film (thickness = 120 microns). This polymer shows a softening point of 165° C., and its inherent viscosity (solution containing 5 grams per liter in chloroform) is 0.68 deciliter per gram. It corresponded to the following formula:

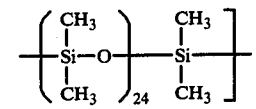

The mechanical properties of the film of 120μ were as follows:
  Resistance to breakage: 117 kilograms per square centimeter
  Elongation of the fracture: 670% b. Preparation of the Diethylene Disilane

Twenty-four and eight-tenths grams (0.125 mole) of bis(amino-4phenyl) methane and 150 cubic centimeters of N-methylpyrrolidone were placed in a balloon-flask. The solution was cooled to 5° C. over a period of 1 hour and 57.5 grams (0.25 mole) of dimethylvinylsilyl-4 benzoyl chloride were added. The reactive environment was kept for 3 hours at 25° C., then precipitated in 1liter of iced water.

After recrystallization in toluene, the bis(dimethylvinylsilyl-4benzamido-4' phenyl) methane was collected.

EXAMPLE 5 a. Preparation of Thermoplastic Elastomer 7.343 grams of disilane of the following formula were placed in a reactor of 250 cubic centimeters:

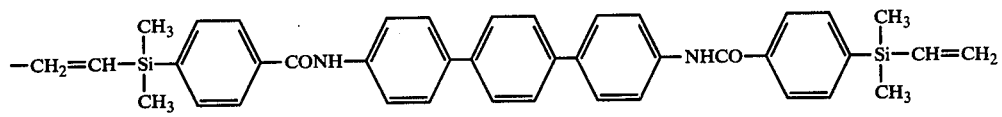

along with
  16.510 grams of α,ω-dihydropolydimethylsiloxane of average molecular weight of 1430, and 71.6 grams of toluene.

The mixture was heated at 105° C. and 0.7 cubic centimeters of a solution of the catalyst of Example 1 were added. Heating was continued for 8 hours, then the mixture was cooled and precipitated in 300 cubic centimeters of methanol. Twenty-two and eight-tenths grams of a white powder were obtained having a softening point of 280° to 290° C. Eight and one-half grams of this powder were placed in a mold consisting of two plates and one frame of 60×60×2 millimeters made of stainless steel, and a pressure of 15 bars was applied at added and the environment was maintained for 7 hours at a temperature of 110° C.

The resulting colorless viscous solution was placed on a glass plate and evaporated at 100° C. A transparent film was obtained. The inherent viscosity of the polymer was 0.75 dl per gram.

This polymer corresponded to the following formula:

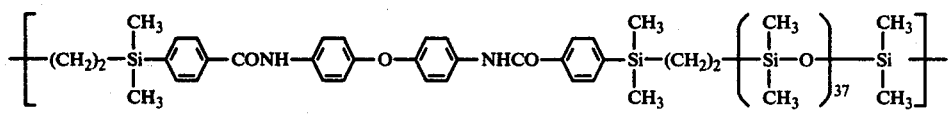

250° for 15 minutes.

The mixture was cooled and a transparent elastomeric plate was obtained having the following characteristics:
Shore hardness A: 86
Elongation at the rupture: 59%
Resistance to rupture: 59 kilograms per square centimeter
The polymer corresponded to the following formula:

The mechanical properties of the film were as follows:
Resistance to breakage: 50 kilograms per square centimeter
Elongation at the breakage: 68% b. Preparation of the Disilane

Forth grams (0.2 mole) of diamino-4,4' diphenylether in the form of a solution in 100 cubic centimeters of NMP were placed in a baloon-flask. Then 93.48 grams

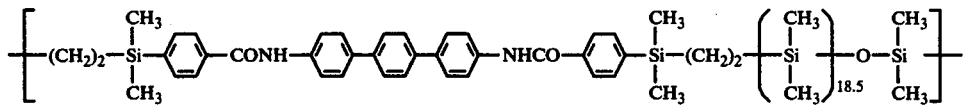

b. Preparation of the Disilane 25.08 grams (0.1 mole) of p-terphenylene diamine and 200 milliters of NMP were placed in a baloon-flask. In the resulting suspension cooled to 15° C. for 1 hour, 45 grams (0.2 mole) of dimethylvinylsilyl-4 benzoyl chloride were added. The heterogeneous reactive environment was cooled for 2 hours to 75° C. The solution was precipitated in 1 liter of ice water. P-terphenylene bis(-dimethylvinylsilyl-4 benzamide) in acetophenone was recrystallized.

A white product in the form of prismatic crystals was obtained with a yield of 89.5 percent. The melting point was 338° C.

EXAMPLE 6 a. Preparation of Thermoplastic Elastomer 4.793 grams of a disilane of the following formula were placed in the reactor of 250 cubic centimeters:

of dimethylvinyl-silyl-4benzoyl chloride were added over a period of 1 hour in a solution cooled to 0° C. The reactive environment was continuously shaken for 2 hours, then precipitated in 1 liter of water distilled while agitating strongly. The p-bis[(dimethylvinyl)silyl] N,N' benzamido-4,4' diphenylether was recrystallized in toluene.

A white product with a melting point of 185° C. was obtained in a yield of 68.2 percent.

EXAMPLE 7 a. Preparation of Thermoplastic Elastomer

The following were placed in a reactor of 250 cubic centimeters.
3.7536 grams of m-phenylene bis(dimethylvinylsilyl)-4 benzamide)
11.0738 grams of α,ω-dihydropolydimethylsiloxane of the average molecular weight representing the number of 1430 and 44.5 grams of toluene.

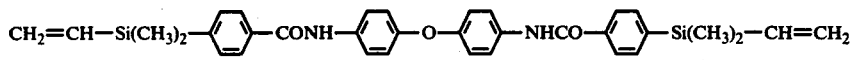

along with
23.271 grams of α,ω-dihydropolydimethylsiloxane of the average molecular weight given as the number of 2800, and
84.2 grams of toluene. The mixture was then heated to 100° C. After that, 0.55 cubic centimeters of a solution of catalyst (according to Example 1) were The mixture was heated to 102° C., then 0.46 cubic centimeters of the solution of the catalyst of Example 1 were added. The viscous resulting solution was kept at 110° C. for 7 hours.

The polymer corresponded to the following formula:

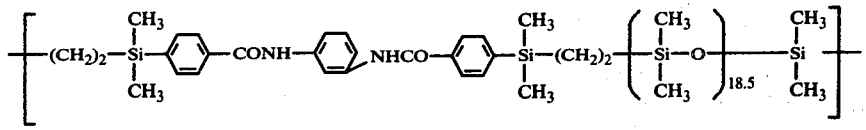

This polymer had an inherent viscosity in chloroform of 0.45 deciliter per gram and softened at about 120° C.

The mechanical properties of a film of 105μ were as follows:
Resistance to breakage: 107±3.3 kilograms per square centimeter
Elongation of the breakage: 721±27% b. Preparation of the Disilane 10.9 grams (0.1 mole) of m-phenylene diamine and 200 milliliters of NMP were placed in a balloon-flask. Forty-five grams (0.2 mole) of dimethylvinysilyl-4 benzoyl were poured over 2 hour in the solution cooled to 5° C. The homogeneous reactive environment was maintained at the temperature of the environment for 2 hours, then precipitated in 1 liter of ice water. The m-phenylene bis(dimethylvinylsilyl-4 benzamide) was recrystallized in a mixture of alcohol and water at the rate of 75/25 (volume/volume).

A translucent product was collected, crystallized in the form of flakes and having a point of instant fusion of 178° C. The yield was 77.5 percent.

EXAMPLE 8 a. Preparation of Thermoplastic Elastomer 3.679 grams of a disilane of the following formula were placed in a reactor of 250 cubic centimeters:

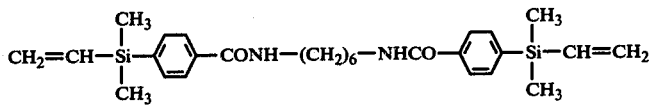

10.6779 grams of an α,ω-dihydropolydimethylsiloxane of the average molecular weight representing the number of 1430 and 43.1 grams of toluene. The mixture was heated to 100° C., and then 0.45 cubic centimeters of a solution of catalyst according to Example 1 were added. The temperature was increased to 110° C. and the reflux continued during 7 hours.

The solution was evaporated in the form of films at 100° C., and transparent polymer was obtained having a softening point of 120° C. and corresponding to the following formula:

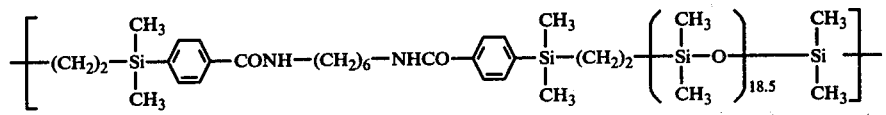

b. Preparation of the Disilane 12.1 grams (0.1 mole) of hexamethylene diamine and 200 milliliters of NMP were placed in a balloon-flask. Over a period of 1 hour 45 grams (0.2 mole) of dimethylvinysilyl-4 benzoyl chloride were poured in the solution cooled to 5° C. The heterogeneous reactive environment was maintained at the temperature of the environment for 3 hours, then precipitated in 1 liter of iced water. The hexamethylene bis(dimethylvinylsilyl-4 benzamide) was recrystallized in cyclohexane.

The product obtained with a yield of 40 percent was white, and crystallized in the form of flakes. The melting point was 128° C.

While the invention has now been described in terms of certain preferred embodiments and exemplified with respect thereto, the skilled artisan will readily appreciate that various modifications, substitutions, changes and omissions, may be made without departing from the spirit thereof. Accordingly, it is intended that the scope of the invention be limited solely by that of the following claims.

What is claimed is:

1. Polysiloxane thermoplastic elastomers having the general formula:

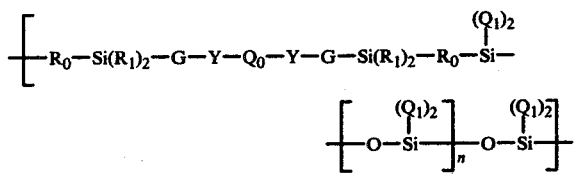

wherein $R_o$ which may be the same or different represents a divalent hydrocarbon radical containing from 2 to 10 carbon atoms; $R_1$ and $Q_1$ which may be the same or different represent monovalent hydrocarbon radicals selected from the group consisting of linear or branched alkyl radicals containing up to 10 carbon atoms, cycloalkyl radicals having 3 to 6 carbon atoms in the ring, aryl radicals, cyano groups and halogen atoms; G which may be the same or different represents an aromatic carbocyclic or heterocyclic radical; $Q_o$ represents a divalent radical selected from the group consisting of aliphatic radicals containing up to 13 carbon atoms, cycloaliphatic radicals having 5 to 6 carbon atoms in the ring, heterocyclic radicals and aromatic radicals containing at least one benzene nucleus; Y which may be the same or different represents a group selected from the group consisting of —CONH— and —COO—; and, n is a number ranging from 0 to 2,000.

2. The polysiloxane thermosplastic elastomers defined by claim 1, wherein G represents a polycyclic aromatic or heterocyclic radical in which the cycles are condensed or otherwise joined together by a simple bond or atom or group selected from the group consisting of O, CH$_2$, C(CH$_3$)$_2$, SO$_2$ and CONH.

3. The polysiloxane thermoplastic elastomers defined by claim 1, wherein the benzene nuclei contained in the group represented by Q$_o$ are condensed or otherwise joined together by a simple bond or atom or a group selected from the group consisting of CH$_2$, C(CH$_3$)$_2$, O, COO, and CONH.

4. The polysiloxane thermoplastic elastomers defined by claim 1, wherein R$_o$ represents a radical selected from the group consisting of ethylene, propylene-1,3, propylene-1,2, butylene-1,4, butylene-1,3, butylene-2,3, pentylene-1,5, pentylene-1,4, hexamethylene, octamethylene, decamethylene, monochloroethylene, dichloroethylene, difluoro-1,2 ethylene, cyclohexylene-1,4 and cyclohexylene-1,3; R$_1$ and Q$_1$, represent a radical selected from the group consisting of methyl, ethyl, trifluoro-4,4,4 butyl, phenyl, o-, m- or p-tolyl, xylyl, p- or m-chlorophenyl, dichloro-3,5 phenyl, trichlorophenyl, tetrachlorophenyl, β-cyanoethyl and γ-cyanopropyl; G represents a radical selected from the group consisting of

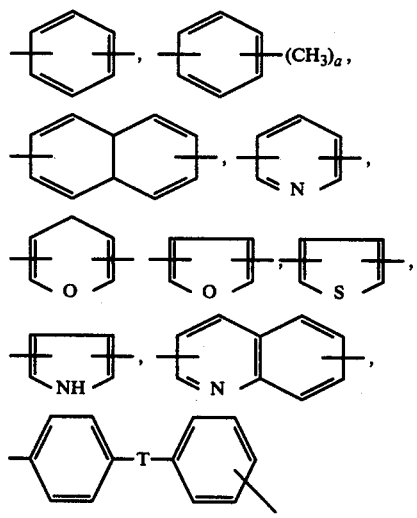

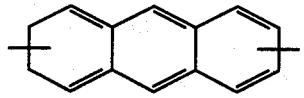

in which a is an integer equal to 1 to 2 and T represents a simple bond or O, CH$_2$, C(CH$_3$)$_2$ or SO$_2$; Q$_o$ represents a divalent radical selected from the group consisting of pentamethylene, hexamethylene, cyclohexylene, a radical defined by G, and a radical containing up to 5 benzene nuclei joined together by a group selected from the group consisting of O, CH$_2$, C(CH$_3$)$_2$, SO$_2$, COO, and CONH; n represents a number ranging from 3 to 500.

5. A process for the preparation of the elastomers defined by claim 1, comprising reacting at least one diethylene silicon compound of the formula

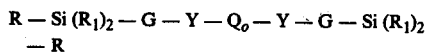

with at least one α,ω-dihydrogenpolysiloxane of the formula

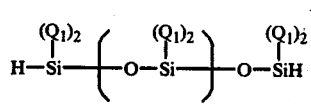

wherein the symbols R$_1$, G, Y, Q$_o$ and Q$_1$ are defined in claim 1 and R, which may be the same or different, represents a monovalent hydrocarbon group containing up to 10 carbon atoms and including a carbon-carbon double bond.

6. The process defined in claim 5, wherein R represents a radical selected from the group consisting of vinyl, allyl, dichloro-2,2 vinyl, trichloro-1,2,2 vinyl, butene-2 yl, propene-1 yl, butene-1 yl, and methyl-2 propene-1 yl.

7. The process defined by claim 5, wherein said diethylene silicon compound is selected from the group consisting of

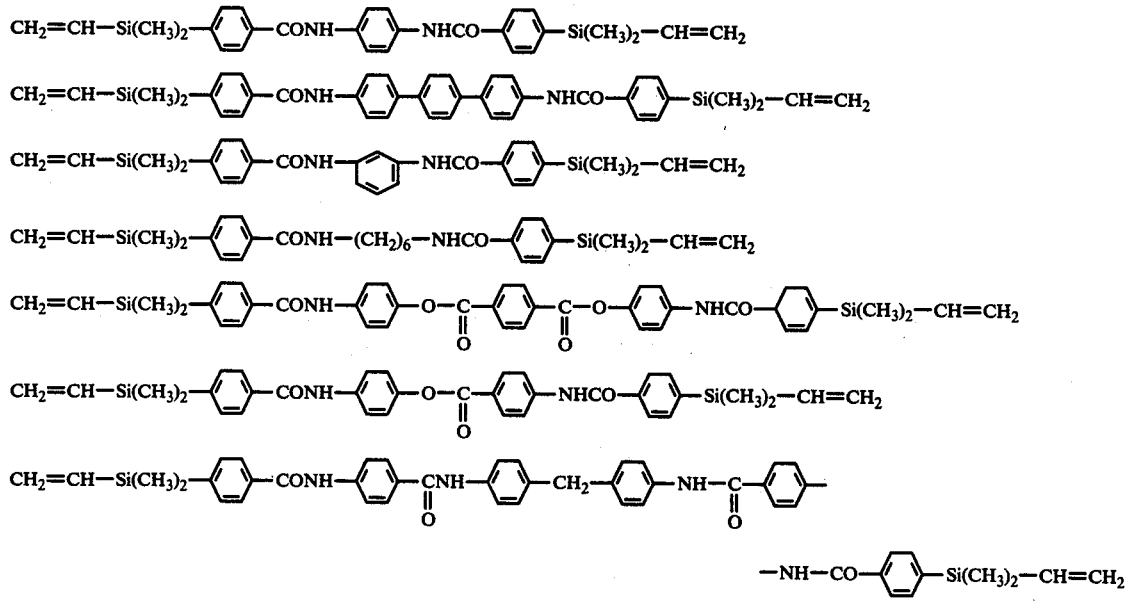

-continued
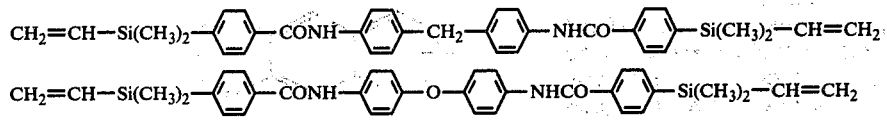
8. Molded thermoplastic elastomers comprising the polysiloxane compound defined by claim 1.
9. A. thermoplastic elastomer film comprising the polysiloxane thermoplastic elastomer defined by claim 1.
10. A thermoplastic elastomer fiber comprising the polysiloxane thermoplastic elastomer defined by claim 1.
* * * * *